INVENTORS
WILLIAM C. EBELING
RALPH WIGHT
WASSIL TUSSUSOV
BY
ATTORNEY

SYSTEM FOR ELIMINATING PHOTOMULTIPLIER NOISE

Filed April 11, 1961 5 Sheets-Sheet 2

INVENTORS
WILLIAM C. EBELING
RALPH WIGHT
WASSIL TUSSUSOV
BY
ATTORNEY

SYSTEM FOR ELIMINATING PHOTOMULTIPLIER NOISE

Filed April 11, 1961 5 Sheets-Sheet 3

INVENTORS
WILLIAM C. EBELING
RALPH WIGHT
WASSIL TUSSUSOV
BY
ATTORNEY

SYSTEM FOR ELIMINATING PHOTOMULTIPLIER NOISE

Filed April 11, 1961 5 Sheets-Sheet 4

INVENTORS
WILLIAM C. EBELING
RALPH WIGHT
WASSIL TUSSUSOV
BY [signature]
ATTORNEY

INVENTORS
WILLIAM C. EBELING
RALPH WIGHT
WASSIL TUSSUSOV

BY [signature]

ATTORNEY

United States Patent Office 3,234,472

Patented Feb. 8, 1966

3,234,472

SYSTEM FOR ELIMINATING PHOTOMULTIPLIER NOISE

William C. Ebeling, River Vale, N.J., and Ralph Wight, Oyster Bay, and Wassil D. Tussusov, New York, N.Y., assignors to Photronics Corp., Flushing, N.Y.

Filed Apr. 11, 1961, Ser. No. 102,228
8 Claims. (Cl. 328—167)

Figure 1:
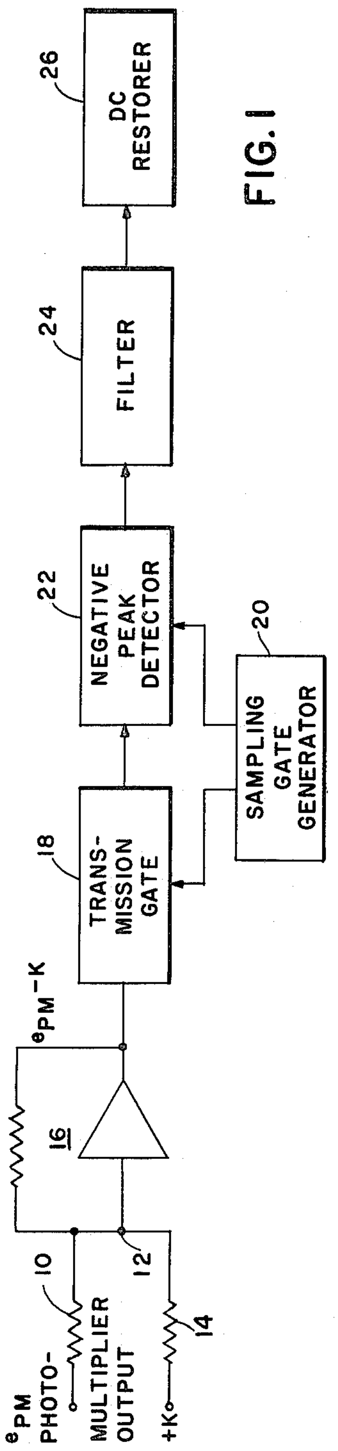

This invention relates to noise elimination systems. More particularly, it relates to a system for eliminating noise from the outputs of such devices wherein the noise comprises elements of the output signal having excursions in a single direction from such output, a typical example of such device being a photomultiplier tube.

The well-known photomultiplier tube essentially comprises a photocathode, an anode and one or more dynodes, i.e., secondary electron-emitting electrodes, sealed in an evacuated transparent envelope or in one having a transparent window. In operation, the first dynode is maintained at a potential which is positive with respect to the photocathode and each succeeding dynode is positive with respect to the one immediately preceding it. The electrons photoelectrically emitted from the cathode are drawn to the first dynode. With a secondary emission ratio greater than unity, secondary electrons are emitted which, in turn, give rise to an amplified current from the next dynode. By the time the electron stream has reached the anode, the original photo current is amplified many fold depending upon the secondary electron emission ratio of each dynode and the number of dynodes.

Since the amplification in a photomultiplier tube is entirely that of a single primary stream of electrons, the incident light that actuates the current may be relatively constant or it may be chopped. The gain thereof remains relatively constant.

In considering the aforesaid signal to noise ratio of a photomultiplier tube, it is to be noted that total absence of light does not result in zero anode current. The small current which occurs under dark conditions is known as the "dark current," the principal components of which are amplified thermionic emissions, leakage current and regenerative ionization. At high levels of cathode illumination, the dark current is of relatively minor importance. At low levels, such as in astronomical work, etc., the dark current may be important.

In certain applications of photomultiplier tubes, it is desirable to obtain wide band operation at maximum sensitivity. If such desired band width is in the megacycle range, high sensitivity photomultiplier tubes generally exhibit a relatively high noise content which in many cases is greater than the amplitude of the signal. Such noise at the output anode of a photomultiplier tube is characterized by relatively large negative going pulses starting from the D.C. or signal level representing the light which is incident upon the photocathode of the photomultiplier tube. An example where wide band operation at maximum sensitivity is desirable is in the reading of a film transparency in conjunction with a high speed scanning device where high resolution data must be read at high speed.

Accordingly, it is an important object of this invention to provide a system for substantially eliminating the noise from the output of those types of devices wherein the noise is characterized by unidirectional excursions from the signal level.

It is a particular object of this invention to provide a system in accordance with the preceding object for substantially eliminating the noise occurring at the output anode of a photomultiplier tube.

Generally speaking and in accordance with the invention, there is provided a system for eliminating noise in a signal wherein the noise comprises unidirectional excursions comprising means for sampling the signal at discrete intervals, and peak detecting means responsive to the output of the sampling means for producing an output therefrom proportional to the peak of the output of the sampling means, the output of the peak detecting means substantially being the signal with the noise components thereof eliminated.

The features of this invention, which are believed to be new, are set forth with particularity in the appended claims. The invention, itself, however, may best be understood by reference to the following description when taken in conjunction with the accompanying drawings which show an embodiment of a noise elimination system according to the invention.

Figure 3:
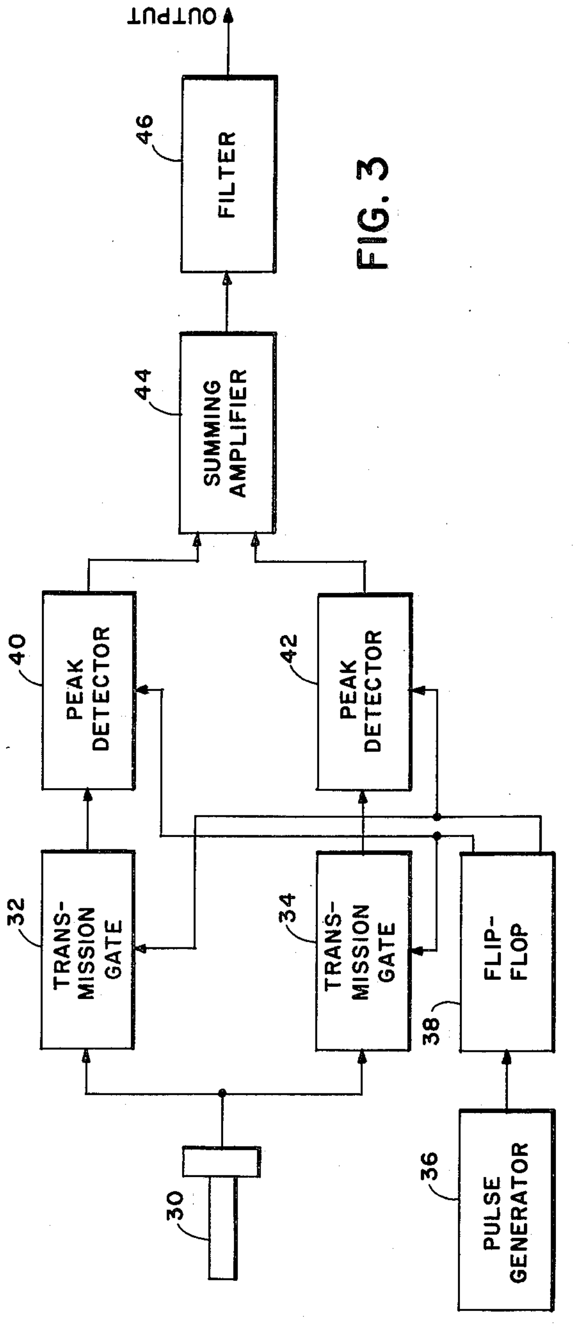
Figure 4:
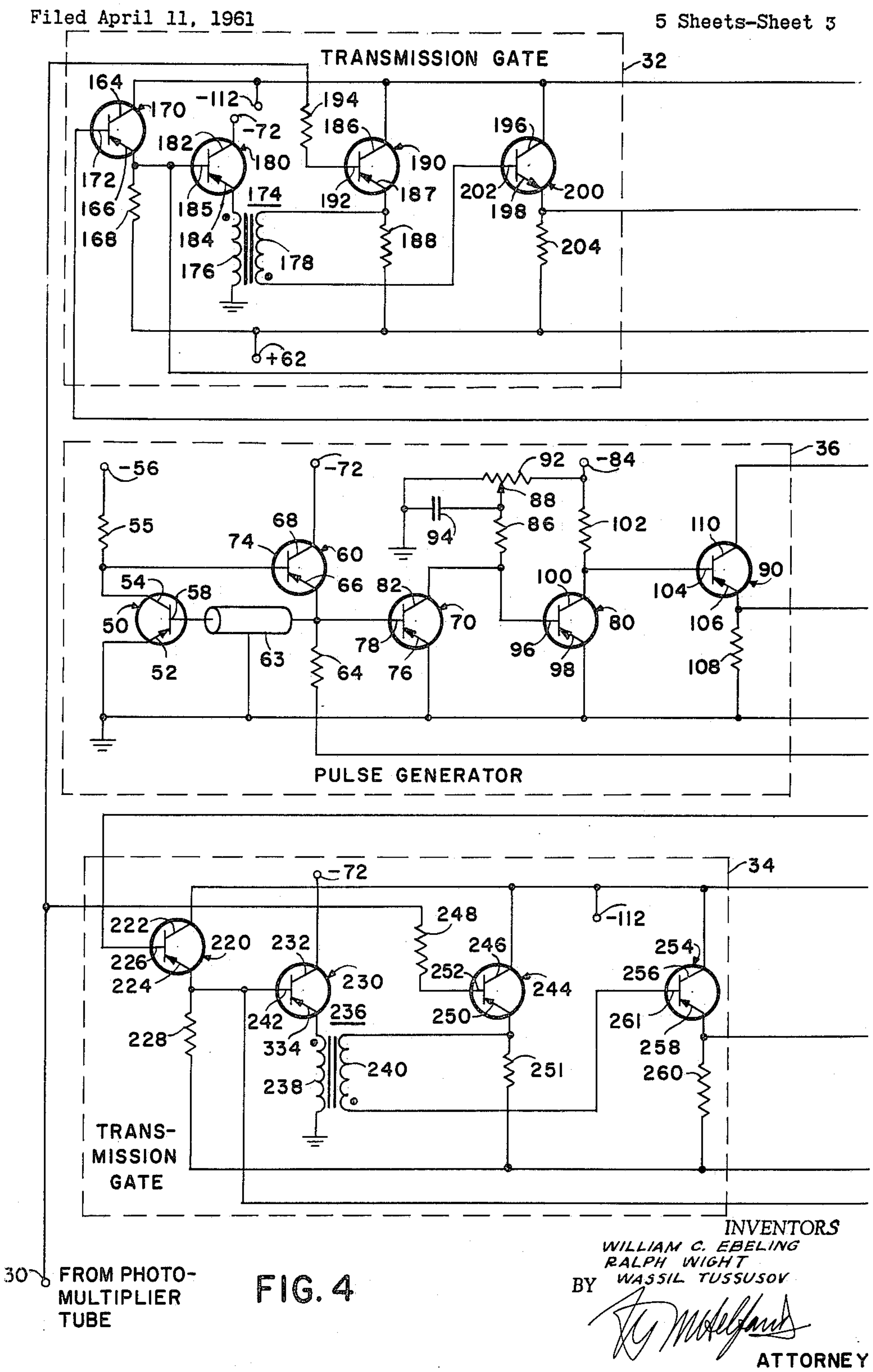
Figures 5, 6:
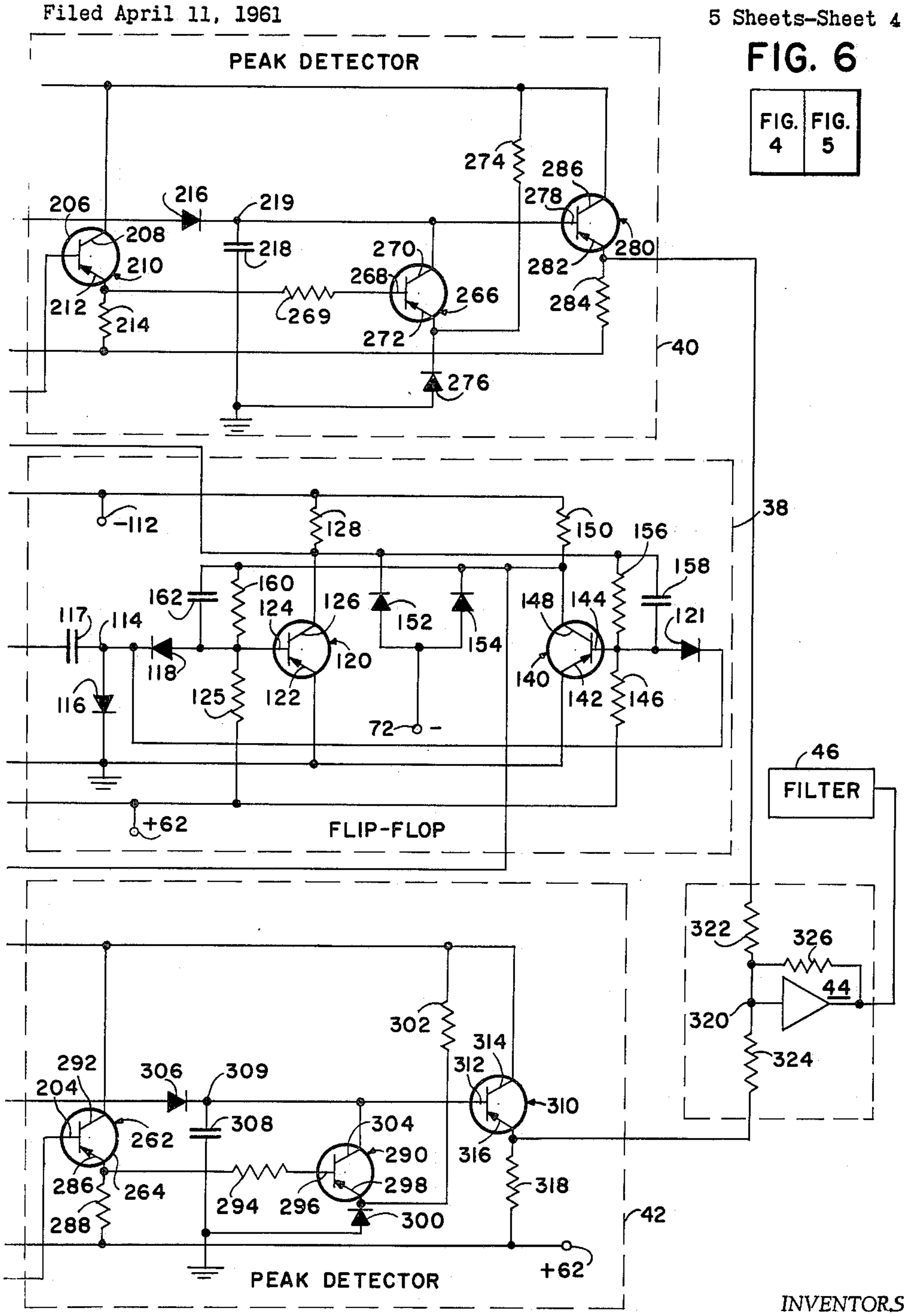

In the drawings:

FIG. 1 is a block diagram of an embodiment of a system in accordance with the principles of invention;

FIGS. 2A–2F comprise a timing diagram of waveforms present at various points in the system of FIG. 1;

FIG. 3 is a block diagram of another embodiment of the invention;

FIGS. 4 and 5 taken together as in FIG. 6 are a schematic depiction of the system shown in block diagram of FIG. 3; and FIGS. 7A–7I comprise a timing diagram of waveforms occurring at various points in the system of FIG. 3 and FIGS. 4–6 during the operation thereof.

Referring now to FIG. 1, the output voltage from the photomultiplier tube or other type device having noise elements, in the output signal which are unidirectional excursions from the signal level is applied to summing point 12 through a resistor 10, such voltage conveniently being referred to as $e_{PM}$. Also applied to summing point 12 through a resistor 14 is a D.C. voltage having a chosen level which is conveniently designated by the letter K. The voltage $e_{PM}$ and K are amplified in a summing amplifier 16 wherein the summed voltages are also reversed in phase to provide at the output of amplifier 16, the voltage $e_{PM}-K$. Summing amplifier 16 may suitably be one of the type shown on pages 27–60 of volume 3, Handbook of Automation, Computation, and Control, published by John Wiley and Sons, Inc.

The latter voltage is applied to a transmission gate stage 18, stage 18 suitably being a circuit which produces an output which is a relatively exact reproduction of the input waveform applied thereto during a selected time interval and is zero otherwise, such type gate also being known as a time-selection circuit. A suitable transmission gate is that shown schematically in FIG. 4. A sampling gate generator 20 is provided which suitably may be a pulse generator, an astable multivibrator, or other like device for providing a train of pulses having a relatively narrow width, such as about 0.2 microsecond and a high percentage duty cycle. A sampling gate generator which may be utilized is the one shown in FIG. 4.

The output of the sampling gate generator is also applied as an input to transmission gate 18 whereby at the output of transmission gate 18, there are provided bursts of signal produced at the output of amplifier 16 which occurs during the pulse times of the pulses provided by generator 20.

The output of transmission gate 18 is applied as an input to a negative peak detector 22 which is suitably a circuit in which the output therefrom is a signal proportional to the peak of the output of the transmission gate. The output of generator 20 is also applied to negative peak detector 22, the periods between pulses from generator 20 being chosen to be a suitable fraction, such as about ten percent of the generator duty cycle for effecting a zero output from detector 22 during such periods, the latter being conveniently designated as reset periods.

Peak detector 22 may suitably be of the type shown in FIG. 5. Of course, the latter peak detectors are positive peak detectors. However, those skilled in the art can readily convert them to function as negative peak detectors.

The output of peak detector 22 is applied to a suitable filter such as a low pass filter 24 wherein there is substantially provided the most negative contour of the output of peak detector 22, the output of filter 24 being applied to a D.C. restorer circuit to provide at the output thereof, the original signal from the photomultiplier tube or other like device with the noise originally present therein substantially eliminated therefrom. D.C. restorer stage 26 may suitably be a negative clamp circuit wherein the lowest level of the output from filter 24 is clamped to ground.

Figures 2A, 2B, 2C, 2D, 2E, 2F:
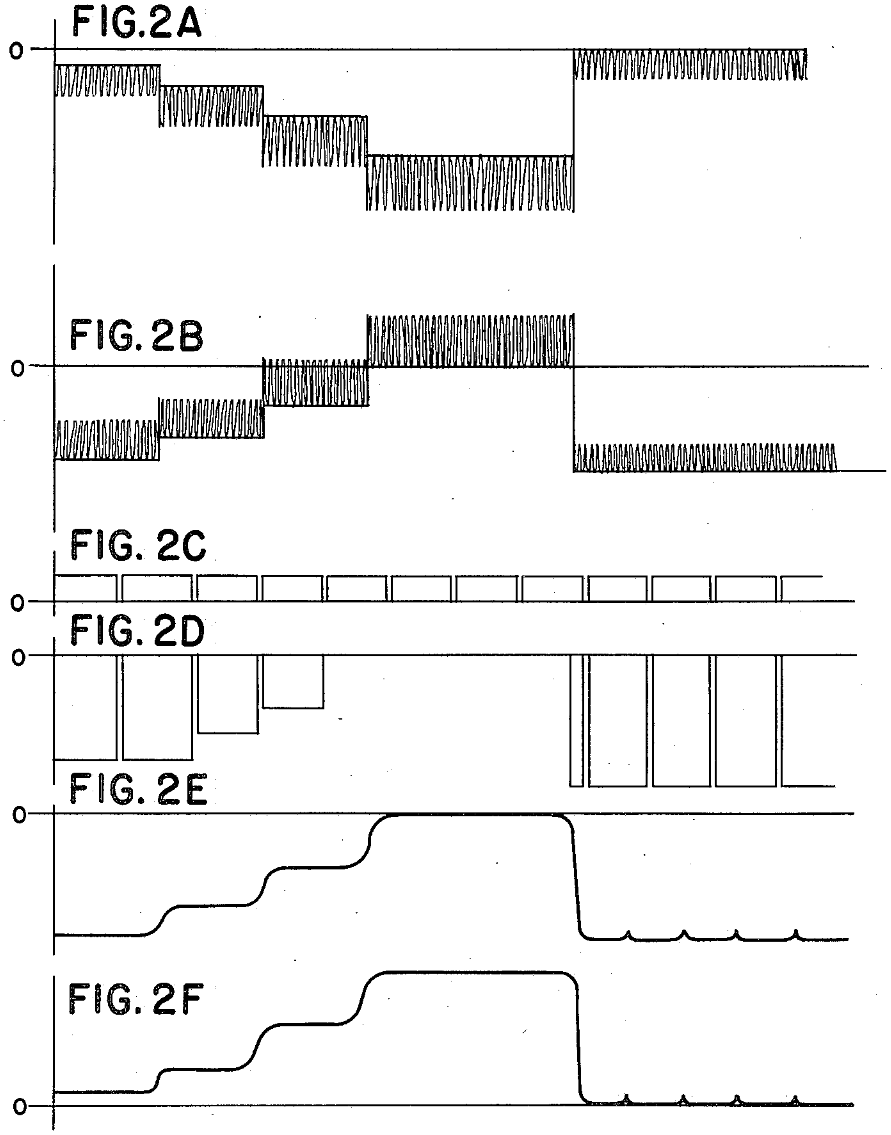

In considering the operation of the system of FIG. 1 reference is now made to FIGS. 2A–2F. FIG. 2A depicts the output of the photomultiplier tube and, as shown, the step-like contour from the zero voltage point in the negative direction is the idealized form of the signal proper. The high frequency pulses having negative excursions from the signal waveform depict the noise present in the output.

FIG. 2B depicts the voltage $e_{PM}-K$, i.e., the inversion of the signal resulting from the summing of the signal of FIG. 2A and the D.C. level K. FIG. 2C is the waveform provided at the output of sampling gate generator 20. FIG. 2D shows the waveform produced at the output of peak detector 22. It is seen that the peak detector output follows the negative contour of the waveform depicted in FIG. 2B. Waveform 2E shows the output of filter 24 and waveform 2F depicts the output of D.C. restorer 26, i.e., with the D.C. restoring voltage added to waveform of FIG. 2E.

Referring now to FIG. 3 which is another embodiment of a system in accordance with the principles of invention, the output of a photomultiplier tube 30 is applied to transmission gates 32 and 34, transmission gates 32 and 34 suitably being circuits of the type which provide an output which is an exact reproduction of the input waveform applied thereto during a selected interval and is zero otherwise, the time interval for transmission being selected by an externally impressed signal or gating signal. A pulse generator 36 is provided for producing a train of pulses of relatively high repetition frequency and having relatively narrow widths such as about 0.2 microsecond.

The output of the pulse generator is applied to a flip-flop stage 38. Flip-flop 38 is suitably a bistable symmetrical switching circuit wherein the times of the pulses produced therefrom provide the sampling times for the output of photomultiplier tube 30 in gates 32 and 34. The output of one of the active devices in flip-flop 38 is applied as an input to transmission gate 32 and the output of the other of the active devices therein is applied as an input to transmission gate 34, such outputs being 180° displaced in phase with respect to each other.

The outputs of transmission gates 32 and 34 are opposite phased bursts of photomultiplier tube signal occurring during the times of positive pulses in the two outputs provided from flip-flop 34.

The outputs of gates 32 and 34 are respectively applied to peak detectors 40 and 42 as are the outputs of flip-flop 38, the flip-flop output applied to peak detector 40 being the same as that applied to transmission gate 34 and the flip-flop output applied to peak detector 42 being the same as that applied to transmission gate 32. Peak detectors 40 and 42 are circuits which provide an output signal proportional to the peak signal received. The respective flip-flop inputs to the peak detectors control them in a manner such that each peak detector is recycled during the period that no output is produced from its associated transmission gate. With this arrangement, they are respectively prepared for the succeeding cycles of information received from their associated transmission gate.

The outputs of the peak detectors 40 and 42 are combined in a summing amplifier 44 which may suitably be one such as summing amplifier 16 in FIG. 6 and the combined output from amplifier 44 is passed through a low pass filter 46 whereby the output of filter 46 is the original signal of photomultiplier tube 30 with the noise components thereof substantially eliminated.

Referring now to FIGS. 4–6, transistors 50, 60, 70, 80, 90, and their associated circuit elements comprise pulse generator stage 36 of FIG. 3.

In transistor 50, the emitter 52 is connected to ground, the collector 54 is connected to a negative potential source 56 of relatively low voltage through a resistor 55 and the base 58 is connected to a source 62 of positive potential through a resistor 64. A cable 63 provides a fixed delay line which controls the timing of the pulse generator. In transistor 60, the emitter 66, is tied to base 58 through cable 63, the collector 68 is connected to a negative potential source 72 and the base 74 is connected to collector 54.

In the operation of transistors 50 and 60, transistor 50 is initially at cutoff and transistor 60 is conductive. The conduction in transistor 60 tends to drive base 58 in the negative direction and by regenerative action, base 58 eventually goes sufficiently negative to permit conduction in transistor 54 thereby tending to drive base 74 in the positive direction. When such conduction occurs in transistor 50, the output at emitter 66 rises in potential and conduction decreases in transistor 60. Transistor 50 conducts until the potential at base 58 rises sufficiently to again render it non-conductive, the period of conduction in transistor 50 being the width of the positive going pulse produced at the output of emitter 66. The cycle repeats itself at a rate determined by the values of the circuit components.

The output at emitter 66 is applied to a two stage amplifier comprising transistors 70 and 80 connected in cascade arrangement. Transistor 70 comprises a grounded emitter 76, a base 78 connected to emitter 66, and a collector 82 connected to a negative potential source 84 through a resistor 86, a tap 88 and a portion of variable resistor 92, resistor 92 having one end grounded, a by-pass capacitor 94 being connected between tap 88 and ground. The output at collector 82 is applied directly to the base 96 of transistor 80, transistor 80 also comprising a grounded emitter 98 and a collector 100 connected to negative potential source 84 through a resistor 102.

The output at collector 100 is applied directly to the base 104 of emitter follower transistor 90. In transistor 90, the emitter 106 is connected to ground through a resistor 108 and the collector 110 is directly connected to negative potential source 112.

The output of pulse generator stage 36 appearing at emitter 106 is applied to flip-flop stage 38 through a capacitor 117. Flip-flop 38 comprises transistors 120 and 140 and their associated circuit elements.

In transistor 120, the emitter 122 is grounded, the base 124 is connected to positive potential source 62 through a resistor 125 and the collector 126 is connected to negative potential source 112 through a resistor 128.

In transistor 140, the emitter 142 is grounded, the base 144 is connected to positive potential source 62 through a resistor 146 and the collector 148 is connected to negative potential source 112 through a resistor 150. Collector 126 is connected to negative potential source 72 through the cathode to anode path of a diode 152 and collector 148 is connected to negative potential source 72 through the cathode to anode path of a diode 154. The output appearing at collector 126 is applied to base 144 through a resistor 156 shunted by a capacitor 158 and the output at collector 148 is applied to base 124 through a resistor 160 in shunt with a capacitor 162.

The voltage appearing at emitter 106 is applied to bases 124 and 144 through series connected capacitor 117 and across the anode to cathode path of a diode 116 the cathode of diode 116, being grounded. The voltage appearing at junction 119 is applied to base 124 through the cathode to anode path of a diode 118 and to base 144 through the cathode to anode path of a diode 121.

In the operation of the flip-flop stage 38, because of difference in transistors and circuit components, one transistor will be initially conductive and the other will be at cutoff. Upon the application of a negative pulse to the base of the non-conductive transistor, it is driven into conductivity and the other transistor is rendered non-conductive in accordance with conventional flip-flop operation. Diodes 152 and 154 and source 72 serve to clamp the negative excursions at collectors 126 and 148 to a voltage not exceeding the voltage of source 72 minus whatever drops may occur across diodes 152 and 154 respectively. The most positive excursions of the voltages at collectors 126 and 148 are to a value slightly below ground potential. The width of the pulses produced at the outputs of the collectors 126 and 148 are respectively determined by the values of the circuit components in stage 38, essentially by resistors 156 and 160 and capacitors 158 and 162.

The output at collector 126 is applied as an input to transmission gate 32 and the output at collector 148 is applied as an input to transmission gate 34.

Transmission gate 32 comprises transistors 170, 180, 190, and 200. Transistor 170 is connected to function as an emitter follower, and comprises a collector 164 directly connected to negative source 112 and an emitter 166 connected to positive source 62 through a resistor 158. The base 172 of transistor 170 is directly connected to collector 126.

Transistor 180 is also connected to function as an emitter follower and comprises a collector 182 directly connected to negative source 72 and an emitter 184 connected to ground through the primary winding 176 of a transformer 174. The base 185 is connected to emitter 166.

Transistor 190 is connected as an emitter follower and comprises a collector 186 connected to negative source 112 and an emitter 187 connected to positive potential source 62 through a resistor 188. Transistor 200 is connected as an emitter follower and comprises a collector 196 connected to negative source 112 and an emitter 198 connected to positive potential source 62 through a resistor 204.

Transistor 200 is connected as an emitter follower and comprises a collector 196 directly connected to negative potential source 112, an emitter 198 connected to positive potential source 62 through a resistor 204 and a base connected to the lower terminal of secondary winding 178 of transformer 174. The output of transistor 200 which is taken at emitter 198 is applied to the peak detector stage 40 as will be further explained herein below.

The output at collector 126 of flip-flop transistor 120 is applied as an input to base 172 of transistor 170. The in phase output at emitter 166 is applied to the base 185 of transistor 180 and is also applied to the base 206 of an emitter follower transistor 210 in peak detector stage 40 as will further be explained hereinbelow. The output from the photomultiplier tube 30 or other device characterized by noise elements in its output having excursions in a single direction is applied as an input to base 192 of emitter follower transistor 190 through a resistor 194.

In secondary winding 178, the inverted output at emitter 184 effected by transformer 174 as indicated by the designating polarity dots, is vectorially added to the output at emitter 187 and such output is applied to the base 206 of emitter follower transistor 210. The values of the circuit components are so chosen in transmission gate stage 32 whereby the normally negative output of photomultiplier tube 30 is raised to a positive level at the output of gate 32 during the pulse times of the pulses produced from collector 126.

Transmission gate 34 is the same as transmission gate 32. Accordingly, it comprises, an emitter follower transistor 220 having a collector 222 connected to negative potential source 112, an emitter 224 connected to positive potential source 62 through a resistor 228 and a base 226 connected to collector 148 of flip-flop transistor 140; an emitter follower transistor 230 comprising a collector 232 connected to negative source 72, an emitter 234 grounded through the primary winding 238 of an inverting transformer 236 and a base 242 connected to emitter 224; an emitter follower transistor 244 comprising a collector 246 connected to negative source 112, an emitter 250 connected to positive source 162 through a resistor 251 and connected to the upper terminal of the secondary winding 240 of transformer 236, and a base 252 connected to tube 30 through a resistor 248; and an emitter follower transistor 254 comprising a collector 256 connected to negative potential source 112, an emitter 258 connected to positive potential source 62 through a resistor 260 and a base 261 connected to the lower terminal of secondary winding 240.

The output at the collector 148 of flip-flop transistor 140 is applied to base 226 of transistor 220. The output at emitter 224 is applied to base 242 of transistor 230 and to the base 264 of an emitter follower 262 in peak detector stage 42.

In the operation of transmission gates 32 and 34, in secondary windings 178 and 240 respectively, the most negative values of the pulses appearing at emitters 184 and 234 are substantially equal to the value of source 72 minus the voltage drops across transistors 180 and 230 respectively and the most positive values of these pulses are just at about ground potential. Since the noise elements of the signal from tube 30 are excursions from the signal level in the negative direction, the mixing of negative pulses with the tube signal containing the noise elements in windings 178 and 240 respectively provides pulsed outputs determined by the voltages of sources 62 and 112 respectively. Accordingly, the output at emitters 198 and 258 respectively are pulse trains having a zero base and pulse pedestals at a positive value, the pulses having the width of the pulses from flip-flop 38. The signal from tube 30 is blanked out during the intervals between positive pulses and during the pulse times, the voltage contour of the pulse pedestals is the resultant of the mixing of the flip-flop pulse pedestal voltages and the output from tube 30.

Peak detector 40 comprises an emitter follower transistor 210, a transistor 266 and an emitter follower transistor 280. As has been described, the output at emitter 166 of transistor 170 is applied to the base 206 of transistor 210, the emitter 212 of transistor 210 being connected to positive source 62 though a resistor 214 and the collector 208 being directly connected to negative potential source 112. The output at emitter 212 is applied to the base 268 of transistor 266 through a resistor 269. In transistor 266, the collector 270 is connected to the base 278 of transistor 280 and the emitter 272 is connected to negative source 112 through a resistor 274 and is also connected to ground through the cathode to anode path of a diode 276.

The output at emitter 198 of transmission gate transistor 200 is fed through the anode to cathode path of a diode 216 and developed across a capacitor 218, the voltage at junction 219 being applied to collector 270 of transistor 266.

In transistor 280, the emitter 282 is connected to positive potential source 62 through a resistor 284 and the collector 286 is connected to negative source 112.

In the operation of peak detector 40, the input to base 206 of transistor 210 substantially follows the contour of the output at collector 126 of the flip-flop transistor 120. The output at emitter 198 causes capacitor 218 to be charged through diode 216. When a noise signal exists at the input to transmission gate 32, i.e., base 192, the resulting modified pedestals of the positive pulses at emitter 198 cause the instantaneous voltage at emitter 198 to become negative with respect to the voltage across capacitor 218. This momentarily renders diode 216 non-conductive and the prevention of further passage of input therethrough until the voltage at emitter 198 again rises to a value above the voltage across capacitor 218. The capacitor acts as a storage element during the time that diode 216 is at cutoff so that the output does not contain the noise signal. The maximum voltage across capacitor 218 during the time of a positive going pulse is the desired output.

At the end of the positive pulse period, i.e., the sampling period, it is necessary to discharge capacitor 218 to prepare it for the next positive pulse cycle. This occurs in the following manner.

It is recalled that the voltage in secondary winding 178 is negative going when the output at emitter 166 of transistor 170 is positive going. Desirably, capacitor 218 should be discharged when the voltage in secondary winding 178 is switched from positive to negative. This instant, of course, is the time when transmission gate 34 in the other channel is enabled.

When the output at emitter 166 is driven positive, the base 268 of transistor 266 is driven in the more positive direction through emitter follower transistor 210. The biasing of transistor 266 is so chosen, that at this point, it is driven into conduction at saturation thereby providing a low impedance path to ground for the quick discharge of capacitor 218.

Peak detector 42 is of the same structure and functions in the same manner as peak detector 40. Thus, it comprises transistors 262, 290, and 310 corresponding to transistors 210, 266 and 280 of peak detector 40.

Transistor 262 has applied to its base 264, the output appearing at emitter 224 of transistor 220 in transmission gate 34. The emitter 286 is connected to positive potential source 62 through a resistor 288 and the collector 292 is connected to negative potential source 112. The output at emitter 286 is applied through a resistor 294 to the base 296 of a discharge transistor 290, transistor 290 comprising an emitter 298 connected to ground through the cathode to anode path of a diode 300 and connected to negative source 112 through a resistor 302. The output at emitter 258 is fed through the anode to cathode path of a diode 306 and developed across a capacitor 308, junction 309 being connected to collector 304 of transistor 290 and base 310 of transistor 310. In transistor 310, the collector 314 is directly connected to source 112 and the emitter 316 is connected to positive potential source 62 through a resistor 318.

The outputs at emitters 282 and 316 of peak detectors 40 and 42 are respectively applied to summing point 320 through resistors 322 and 324, the signal at summing point 320 being applied to summing amplifier 44, resistor 326 being the feedback resistor connected between the output and input of amplifier 44.

The output of amplifier 44 is applied to a low-pass filter 46 wherein residual pulses resulting from the summation are removed.

Summing amplifier 44 and filter 46 are circuits well known in the art and no further description thereof is deemed necessary.

Considering the operation of the system depicted in FIGS. 4–6, reference is also made to FIGS. 7A–7I which is a timing diagram of the waveform present in the various points of the system of FIG. 3 and FIGS. 4–6.

Figures 7A, 7B, 7C, 7D, 7E, 7F, 7G, 7H, 7I:
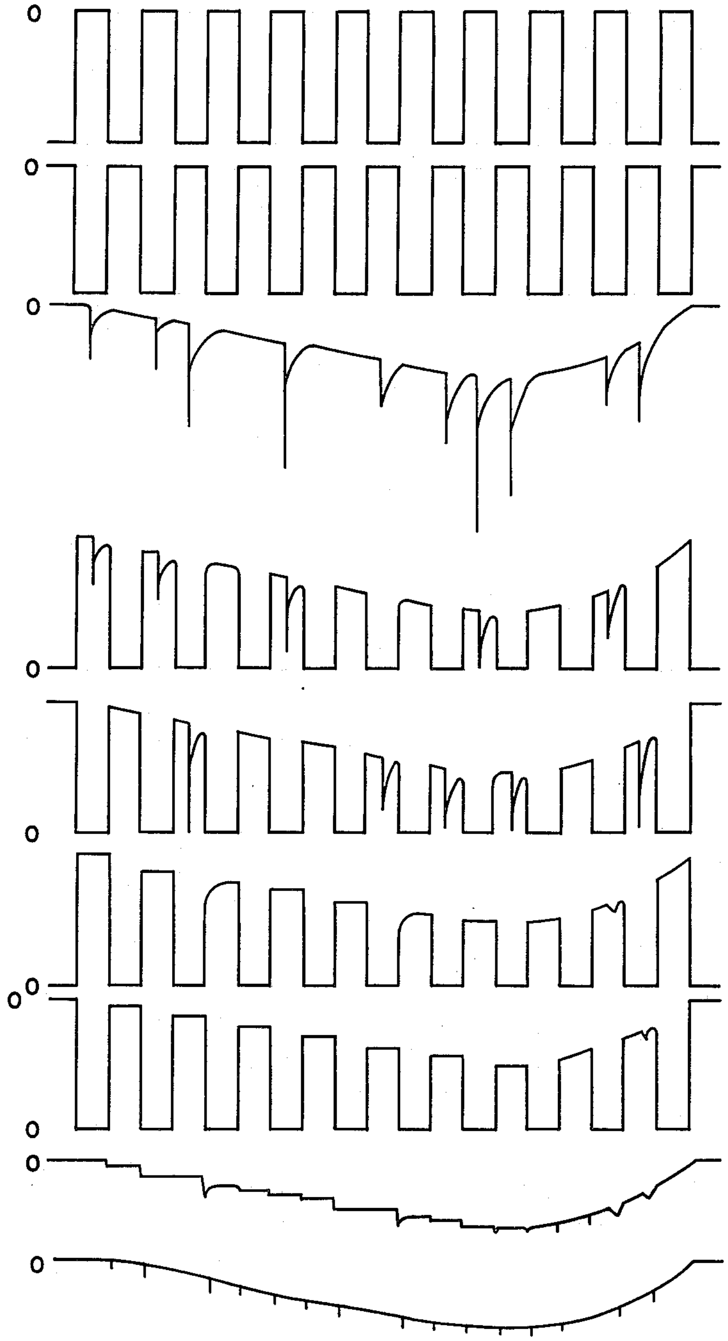

In these waveforms, it is seen that the combination of pulse generator 36 and flip-flop 38 produce pulse train outputs from transistors 120 and 140 of flip-flop 38 which are 180° out of phase with respect to each other, FIGS. 7A and 7B show the waveforms of the outputs at collectors 12 6and 148 of transistors 120 140 respectively. The values of the circuit components in pulse generators 36 and flip-flop 38 may be so chosen whereby the rise times in the waveforms of FIGS. 7A and 7B respectively may be approximately 30 nanoseconds and fall times may be 50 nanoseconds. The width of each pulse may be chosen to be about 1.0 microsecond. Since these waveforms, after modulation and peak detection are ultimately combined, it is desirable to have the pulse times respectively thereof both quite short and equal to provide a minimal residual output at the switching points after summation.

The respective signals from the flip-flop are passed through emitter followers comprising transistors 170 and 180, and 220 and 230 to drive transformers 174 and 236. Due to the series connections of the secondary windings 178 and 240, their respective induced voltages are added respectively to the outputs of the emitter followers comprising transistors 190 and 244 to provide the driving voltages respectively for the emitter followers comprising transistors 200 and 254.

Since the signal at the bases 192 and 252 of transistors 190 and 244 respectively, is the photomultiplier tube output, the resultant signals at the bases 202 and 261 of transistors 200 and 254 is the same signal alternately raised to a positive and lowered to a negative level. Only the positive pulse periods, such as one microsecond, in which the photomultiplier signal is raised to the positive level, is utilized in the system, the negative pulse period being discarded.. Suitably, the value of the transmission gate circuit components may be so chosen whereby the photomultiplier signal is raised to a bias level of about 1.5 volts.

FIG. 7C depicts a somewhat idealized waveform of the output of a photomultiplier tube with negative going noise signals, FIG. 7D depicts the output appearing at emitter 198 in transmission gate 32 and FIG. 7E depicts the output appearing at emitter 258 in transmission gate 34. FIGS. 7F and 7G depict the respective waveforms of the outputs at peak detectors 40 and 42 respectively, i.e., the outputs appearing at emitters 282 and 316. FIG. 7H depicts the waveform resulting from the combining of the waveforms of FIGS. 7F and 7G and FIG. 7I depicts the passing of the resultant of the combined waveforms therein by summing amplifier 44 and the filtering of the output of amplifier 44 in filter 46. It is seen that the waveform of FIG. 7I is substantially the original photomultiplier output signal smoothed out and with the noise substantially removed therefrom.

There are listed hereinbelow the values of the circuit components of the system of FIG. 3 and FIGS. 4–6 for providing operation in accordance with the foregoing description of the functioning of the system. It is to be understood that these values are given as examples of a particular design and that it is not intended that the invention be limited thereby since the invention may be utilized for its purpose in any of an infinite number of designs.

| | |
|---|---|
| Resistors **125** and **146** | 100K ohms. |
| Resistors **168, 188, 204, 214, 284, 228, 251, 260, 286**, and **318**. | 6.8K ohms. |
| Resistors **274, 160, 156** and **302** | 2.7K ohms. |
| Resistors **102, 269**, and **294** | 1K ohms. |
| Resistors **128** and **150** | 620 ohms. |
| Resistor **92** | 500 ohms. |
| Resistors **55** and **86** | 470 ohms. |
| Resistors **194** and **248** | 100 ohms. |

| | |
|---|---|
| Capacitor **94** | 0.01 mmf. |
| Capacitor **117** | 0.001 mmf. |
| Capacitors **218** and **308** | 100 pf. |
| Capacitors **158** and **162** | 50 pf. |
| All transistors | Type 2N240. |
| Positive potential source **62** | +22.5 volts. |
| Negative potential source **84** | —9.0 volts. |
| Negative potential source **112** | —6.0 volts. |
| Negative source **72** | —3.0 volts. |
| Negative source **56** | —1.5 volts. |
| Diodes **216, 118, 121, 152, 154,** and **306** | Type IN914. |
| Diode **117** | Type IN128. |
| Diodes **276** and **300** | Type S320G. |

While there have been described what are considered to be the preferred embodiments of this invention, it will be obvious to those skilled in the art that various changes and modifications may be made without departing from the invention and it is, therefore, aimed in the appended claims to cover all such changes and modifications as fall within the spirit and scope of the invention.

What is claimed as new and desired to be secured by Letters Patent of the United States is:

1. A system for eliminating noise from a signal wherein said noise consists of negative excursions from said signal level comprising sampling gate generating means for producing a train of pulses having a relatively high percentage duty cycle, summing amplifier means, a positive unidirectional potential, means for applying said signal and said potential to said summing amplifier means to produce the inversion of a signal proportional to the value of said signal minus the value of said potential, transmission gate means, means for applying the output of said gate generating means and said summing amplifier means to said transmission gate means to reproduce the output of said amplifier means during said pulses, peak detecting means, means for applying the output of said transmission gate means and said gate generating means to said peak detecting means to produce a voltage proportional to the peak of the output of said transmission gate means, the interval between pulses of said gate generating means serving to recondition said peak detecting means for the next succeeding output pulse from said transmission gate means, means responsive to the output of said peak detecting means for filtering out residual elements from said last named output, D.C. restoring means, and means for applying the output of said filtering means to said D.C. restoring means to produce said signal with said noise substantially eliminated therefrom.

2. A system as defined in claim 1 wherein said summing amplifier means is a passive resistive adder operatively associated with a D.C. amplifier which provides a 180° phase shift.

3. A system for eliminating noise from a signal wherein said noise consists of unidirectional excursions from the signal level comprising first means for discretely sampling said signal during regularly recurring times, second means for sampling said signal during the intervals between said times, first peak detecting means responsive to the application thereto of the output of said first sampling means for providing an output proportional to the peak of the output from said first sampling means, second peak detecting means responsive to the application thereto of said second sampling means for producing an output proportional to the peak of the output from said second sampling means, and means for combining the outputs of said first and second peak detecting means, the output of said combining means being said signal with said noise substantially eliminated therefrom.

4. A system for eliminating noise from a signal wherein said noise consists of unidirectional excursions from the signal level comprising first means for discretely sampling said signal during regularly recurring times, second means for sampling said signal during the intervals between said times, first peak detecting means responsive to the application thereto of the output of said first sampling means for producing an output proportional to the peak of the output from said first sampling means, second peak detecting means responsive to the application thereto of the output of said second sampling means for producing an output proportional to the peak of the output from said second sampling means, means for combining the outputs of said first and second peak detecting means and filter means in circuit with said combining means to remove residual elements from said combining means output, the output from said filter means being said signal with the noise substantially eliminated therefrom.

5. A system for eliminating noise from a signal wherein said noise consists of negative excursions from the signal level comprising means for producing first and second trains of pulses of equal width and 180° displaced in phase with respect to each other, first and second transmission gate means, means for applying said signal and said first pulse train to said first transmission gate means to produce discrete reproductions of said signal occurring during said first train pulses, the output of said first transmission gate means being at a positive potential level, means for applying said signal and said second pulse train to said second transmission gate means, to produce discrete reproductions of said signal occurring during said second train pulses, the ouput of said second transmission gate means being at a positive potential level, first and second peak detecting means, means for applying the output of said first gate means and said second pulse train to said first peak detecting means to produce a voltage proportional to the peak output of said first gate means, the intervals between the pulses of said second train serving to reset said first peak detecting means for the next succeeding pulse from said first transmission gate means, means for applying the output of said second transmission gate means and said first pulse train to said second peak detecting means to produce a voltage proportional to the peak output of said second transmission gate means, the intervals between the pulses of said first train serving to reset said second peak detecting means for the next succeeding pulse output from said second transmission gate means, means in circuit with said first and second peak detecting means for combining the outputs therefrom, and filter means responsive to the application thereto of the output of said combining means for removing residual elements from said last named output, the output of said filter means being said signal with the noise substantially eliminated therefrom.

6. A system for eliminating noise from a signal wherein said noise consists of negative excursions from the signal level comprising means for producing first and second trains of pulses of equal width and 180° displaced in phase with respect to each other, first and second transmission gate means for inverting said respective pulse trains and for sampling said signal during said pulses of said trains, said transmission gate means outputs respectively being at a positive potential level, means for applying said signal and said first pulse train to said first transmission gate means, to produce positive samplings of said signal during the pulse times of said second pulse train, means for applying said signal and said second pulse train to said second transmission gate means to produce samplings of said signal during the pulse times of said first pulse train, first and second peak detecting means, means for applying the output of said first transmission gate means and said first pulse train to said first peak detecting means to produce an output proportional to the peak output of said first transmission gate means, the intervals between pulses of said first train serving to condition said first peak detecting means for the next succeeding pulse output from said first transmission gate means, means for applying the output of said second transmission gate means and said second pulse train to said second peak detecting means to produce an output proportional to the peak output of said second transmission gate means, the intervals between pulses of said second train serving to condition said second peak detecting means for the next succeeding pulse output from said second transmission gate means, means in circuit with said first and second peak detecting means for combining the outputs therefrom and filter means responsive to the application thereto of the output of said combining means for removing residual elements from said last named output, the output of said filter means being said signal with said noise substantially eliminated therefrom.

7. A system as defined in claim 6 wherein said means for producing said first and second pulse trains comprises pulse generating means and a bistable circuit responsive to the application thereto of pulses from said generating means for producing two like pulse trains, 180° displaced in phase with respect to each other.

8. A system as defined in claim 6 wherin said combining means comprises a passive resistive adder operatively associated with a D.C. amplifier.

References Cited by the Examiner

UNITED STATES PATENTS

| | | | |
|---|---|---|---|
| 2,743,438 | 4/1956 | Page | 328—165 |
| 2,763,721 | 9/1956 | Hansell et al. | 328—163 X |
| 3,100,874 | 8/1963 | Soland | 328—165 |
| 3,114,884 | 12/1963 | Jakowatz | 328—167 X |

ARTHUR GAUSS, *Primary Examiner.*

HERMAN K. SAALBACH, JOHN W. HUCKERT, *Examiners.*